Dec. 12, 1961      A. J. RAE      3,012,789
GRAMOPHONE RECORD PLAYING APPARATUS Filed May 8, 1957      9 Sheets-Sheet 1

Inventor
A. J. Rae
By Glascott Downing Diebold
Attys

Dec. 12, 1961   A. J. RAE   3,012,789
GRAMOPHONE RECORD PLAYING APPARATUS
Filed May 8, 1957   9 Sheets-Sheet 2

Inventor
A. J. Rae

Dec. 12, 1961 A. J. RAE 3,012,789
GRAMOPHONE RECORD PLAYING APPARATUS
Filed May 8, 1957 9 Sheets-Sheet 3

FIG. 5a.

Inventor
A. J. Rae

FIG. 5b.

Dec. 12, 1961 A. J. RAE 3,012,789
GRAMOPHONE RECORD PLAYING APPARATUS
Filed May 8, 1957 9 Sheets-Sheet 5

FIG. 6.

Inventor
A. J. Rae
By Glascock Downing Seebold
Attys.

Dec. 12, 1961  A. J. RAE  3,012,789
GRAMOPHONE RECORD PLAYING APPARATUS
Filed May 8, 1957  9 Sheets-Sheet 6

FIG. 7.

Inventor
A. J. Rae

Dec. 12, 1961 A. J. RAE 3,012,789
GRAMOPHONE RECORD PLAYING APPARATUS
Filed May 8, 1957 9 Sheets-Sheet 7

FIG. 8.

Inventor
A. J. Rae

Dec. 12, 1961 A. J. RAE 3,012,789
GRAMOPHONE RECORD PLAYING APPARATUS
Filed May 8, 1957 9 Sheets-Sheet 8

FIG. 9.

Inventor
A. J. Rae

Dec. 12, 1961  A. J. RAE  3,012,789
GRAMOPHONE RECORD PLAYING APPARATUS
Filed May 8, 1957  9 Sheets-Sheet 9

Inventor
A. J. Rae

United States Patent Office 3,012,789
Patented Dec. 12, 1961

3,012,789
GRAMOPHONE RECORD PLAYING APPARATUS
Alexander James Rae, Iver, England, assignor to Electric & Musical Industries Limited, Hayes, England, a company of Great Britain
Filed May 8, 1957, Ser. No. 657,873
Claims priority, application Great Britain May 11, 1956
8 Claims. (Cl. 274—10)

This invention relates to gramophone record playing apparatus of the kind having automatic record changing mechanism and automatic means for gauging the diameter of a record to be played and means for controlling the landing position of the pick-up of the apparatus according to the gauged diameter of a record to enable the apparatus to play automatically in sequence a plurality of records of different diameters.

According to one feature of the present invention there is provided gramophone record playing apparatus comprising means for supporting a pile of records to be played above the turntable, releasing means for releasing the lowermost record in said pile to enable it to move towards said turntable, means for thereafter supporting the record in an intermediate position above the turntable, automatic means for gauging the diameter of a record to be played, and means for controlling the landing position of the pick-up of the apparatus according to the gauged diameter of a record to enable the pick-up to land on records of different diameters, wherein the gauging means comprises the pick-up arm which is caused to engage the periphery of a record to be played when said record is supported in said intermediate position and effect adjustment of said controlling means according to the gauged diameter of a record.

Automatic record changing mechanism of the kind described as employed currently is usually arranged to be able to play a stack of mixed 12", 10" and 7" records and is usually provided with means for moving the pick-up arm to one or other of three predetermined positions in relation to the turntable such that the pick-up will land correctly on records of the sizes stated. It will be appreciated that these known forms of record playing appartus are not suitable for playing records of sizes other than those stated since such apparatus is incapable of moving the pick-up arm to positions intermediate said predetermined positions such as would be suitable for records of intermediate sizes.

An object of the invention is to provide an improved gramophone record playing apparatus in which the apparatus is capable of providing the correct landing position for a pick-up whereby the pick-up can be caused to land on the correct position for any diameter of record including and between the maximum and minimum diameters of the record for which the apparatus is designed.

According to the invention there is provided gramophone record playing apparatus comprising a gauging member, automatic means for causing said member to engage the periphery of a record to be played to gauge the diameter of said record, and controlling means comprising a stop, means mounting said stop for movement and adjustment to any position within a range of movement and determined by said gauged diameter, and means for retaining said stop in its adjusted position to control the landing position of a pick-up to enable said pick-up to land on a record of any diameter within a range of diameters and means for releasing said retaining means to enable said pick-up to track the record.

In order that the said invention may be clearly understood and readily carried into effect, it will now be more fully described with reference to the accompanying drawings, in which.

In the embodiment of the invention shown the records to be played are held in stack formation on a record post projecting from the turntable and are released singly and allowed to fall onto the turntable but before a released record reaches the turntable it is retained for an instant in an intermediate position and when in such position the size of the record is gauged by the pick-up arm so as to control the landing position of the pick-up, in accordance with the detected size of the record. The record is then released from said intermediate position and when on the turntable the pick-up is moved to engage the record at a position according to the detected size of the record.

Figure 1:
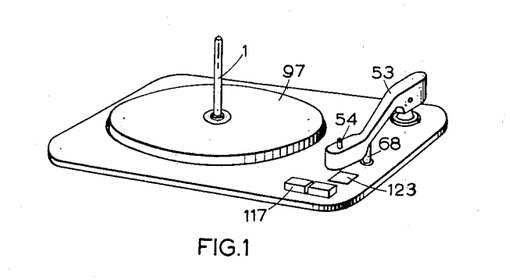
FIGURE 1 is a perspective view on a reduced scale of gramophone record playing apparatus in accordance with the invention, showing the baseplate and parts disposed above the baseplate.

As shown in FIGURE 1 the external appearance of gramophone record playing apparatus in accordance with the invention can be similar to that of gramophone record playing apparatus in which automatic record changing apparatus is not provided, with the exception of an elongated record post, since with a straight record post described with reference to FIGURES 2, 3 and 4, no record steadying arm is required and an additional gauging member for gauging the diameter of records is not required.

Figure 2:
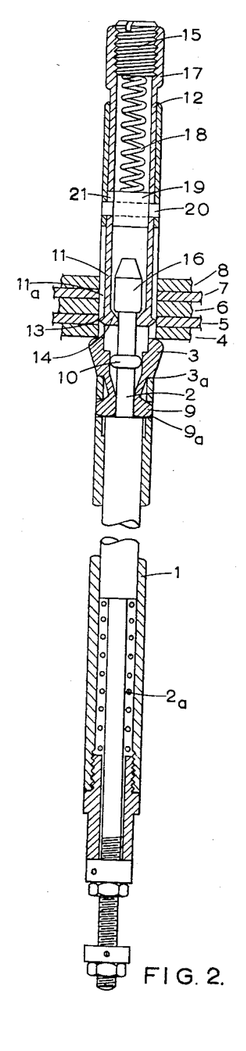
FIGURES 2, 3 and 4 show the same view in cross section of the preferred form of record post for the apparatus with the moving parts thereof occupying different positions whilst engaged in releasing a record.
Figure 3:
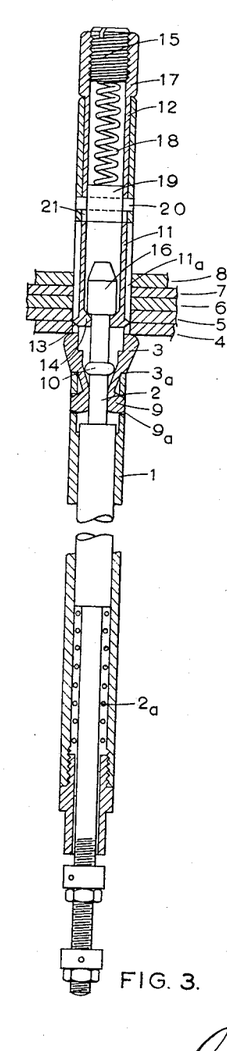
Figure 4:
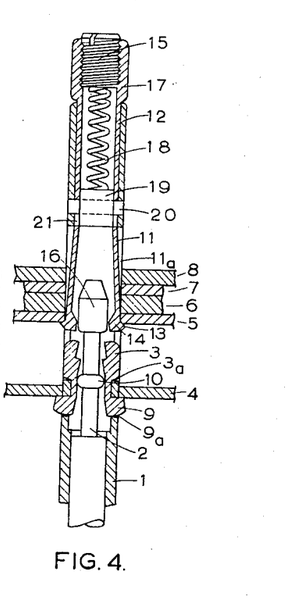

The preferred form of record post for use in the invention is shown in FIGURES 2, 3 and 4 and comprises a straight hollow record post 1 provided with a central spindle or push rod 2 which is adapted to be moved positively downwardly against the pressure of the compression spring 2a and then upwardly by means of said spring 2a, a record by the record changing mechanism in a manner to be described hereafter. Three main retractable record supporting members 3 are provided symmetrically disposed around post 1, two of which members 3 are visible in FIGURE 2 in their normal positions projecting through apertures 3a in the post 1 so as to be capable of supporting a stack of records in a state of equilibrium. Records 4, 5, 6, 7 and 8, are shown mounted on the post but the stack may comprise a greater or lesser number of records. Subsidiary retractable supporting members 9, mounted below the main members 3, are in the present embodiment connected to each of said main members to form unitary structures which are capable of rocking movement so that whilst said main members project from the record post said subsidiary members 9 remain within the post and the act of retracting said main members into the post causes said subsidiary members to project therefrom through apertures 9a in the post 1. The unitary structures are shaped as shown in FIGURES 2, 3 and 4 so that when the main members are in the position shown in FIGURE 2 the portions connecting the main and subsidiary members form a tapered passage as shown in FIGURES 2 and 3 and likewise when the subsidiary supporting members 9 project from the record post a tapered passage is provided between the members 3 as shown in FIGURE 4. In order to cause rocking movement of the unitary structures described above, the spindle 2 is provided with a collar 10 which is normally positioned between the main supporting members 3, as shown in FIGURE 2 so as to maintain them in the position in which they project from the post 1. During a record releasing operation the spindle 2 is moved downwardly and the collar 10 moves into said tapered passage shown in FIGURES 2 and 3 so causing rocking movement of said structures so that the subsidiary members 9 are caused to project from the post and the main members 3 to be retracted into the post. This operation enables the lowermost record 4 in the stack to be released and then to move to the position shown in FIGURE 4 where it is held by the members 9 in an intermediate position. With the retraction of the main members 3 it is necessary to provide means for temporarily supporting the stack of records until the members 3 are again caused to move outwardly from the post. For this purpose temporary supporting members 11 are provided above the main members 3, said members 11 being in the form of three spring blades integral at their upper ends with a sleeve 12 and provided with outwardly projecting edges 13 and inwardly projecting portions 14 at their lower ends, said edges 13 being normally separated from the main supporting members 3 by a distance which is less than the sum of the thicknesses of the two lowermost records 4 and 5 in the stack and greater than the thickness of the lowermost record 4. The sleeve 12 is at its upper end either connected to or formed integral with a hollow cylindrical member 17 in which is provided an adjustable screw 15. A spring 18 is disposed between said screw 15 and a cylindrical plug 19 disposed within the sleeve 12. A pin 20 passes transversely through the plug 19 and projects from either side thereof and passes through diametrically opposite slots 21 in the sleeve 12 and engages in the post 1. The upper end of the spindle 2 is provided with an enlarged cylindrical portion 16 which is normally positioned between said blades but not in pressing contact therewith. During a record releasing operation, as the spindle 2 is moved downwardly the enlarged portion 16 thereof engages against said inwardly projecting portions 14 so that the temporary supporting members are urged outwardly through apertures 11a in the post until they press against the edge of the central aperture of the record 5. Since then the enlarged portion 16 can no longer urge said temporary members 11 apart, the latter members are caused to move downwardly together with the sleeve 12 and the member 17 against the pressure of the spring 18 until said projecting edges 13 locate the gap between the records 4 and 5 when said temporary supporting members are moved outwardly by the portion 16 so that the stack of records, with the exception of the lowermost record 4, is supported by said projecting edges 13. The sleeve 12 is guided in its movement by the plug 19, and the slots 21 in said sleeve are arranged to be of sufficient length to enable the members 11 and sleeve 12 to undergo the required downward movement.

Commencing from the normal position shown in FIGURE 2 the sequence of operations upon downward movement of the spindle 2 is thus the location of the gap between the two lowermost records 4 and 5 by the temporary supporting members as shown in FIGURE 3 followed by coincident retraction into the post of the main supporting members 3 and projection from the post of the subsidiary supporting members 9 so that the lowermost record 4 is released by said main members 3 and is supported in an intermediate position by said subsidiary members 9 as shown in FIGURE 4. Whilst the record is supported in said intermediate position the diameter of the record is gauged by the pick-up of the apparatus so that the landing position of said pick-up can be controlled in the manner hereafter described. Thereafter the spindle 2 is moved upwardly by the spring 2a so that the subsidiary members 9 are retracted into the post so releasing the record 4, which then continues its movement down the post onto the turntable and at the same time the main members 3 are caused to project from the post when the collar 10 moves into the tapered passage shown in FIGURE 4. The enlarged portion 16 of the spindle then moves wholly above the inwardly projecting portions 14 so that the temporary supporting members 11 spring back into the post 1 and are caused to move upwardly by the release of tension in the spring 12, and the stack of records is supported by the main members 3. Thus the condition of the apparatus is again similar to that shown in FIGURE 1 with the exception that the record 5 is now the lowermost record in the stack.

Figure 5A:
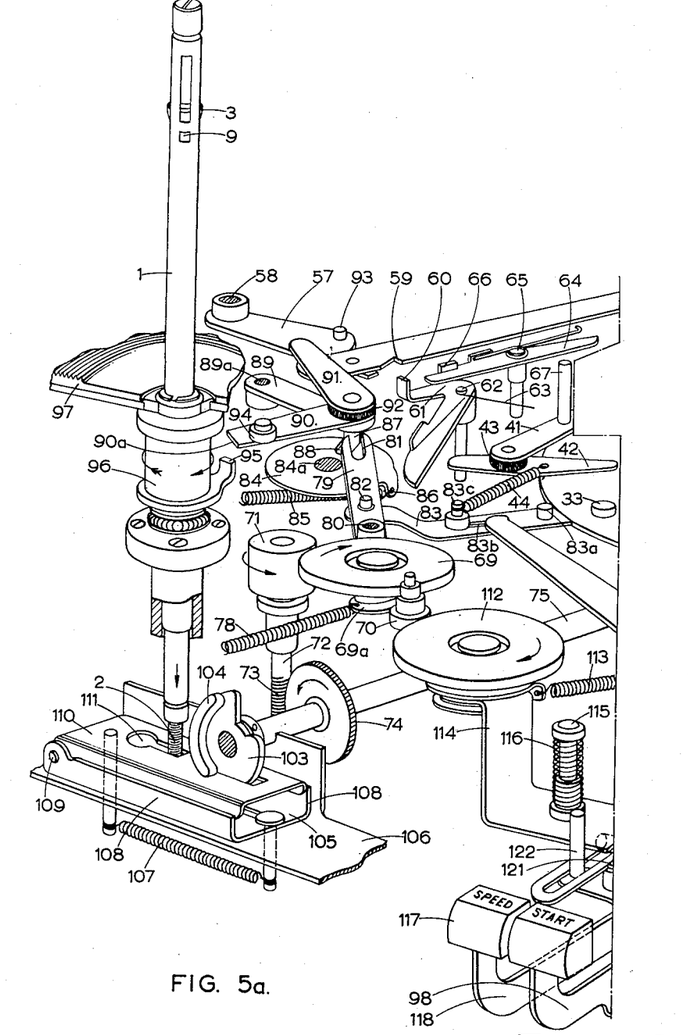
FIGURES 5a and 5b are perspective views of the mechanism operating the apparatus as seen when the baseplate shown in FIGURE 1 is removed.
Figure 5B:
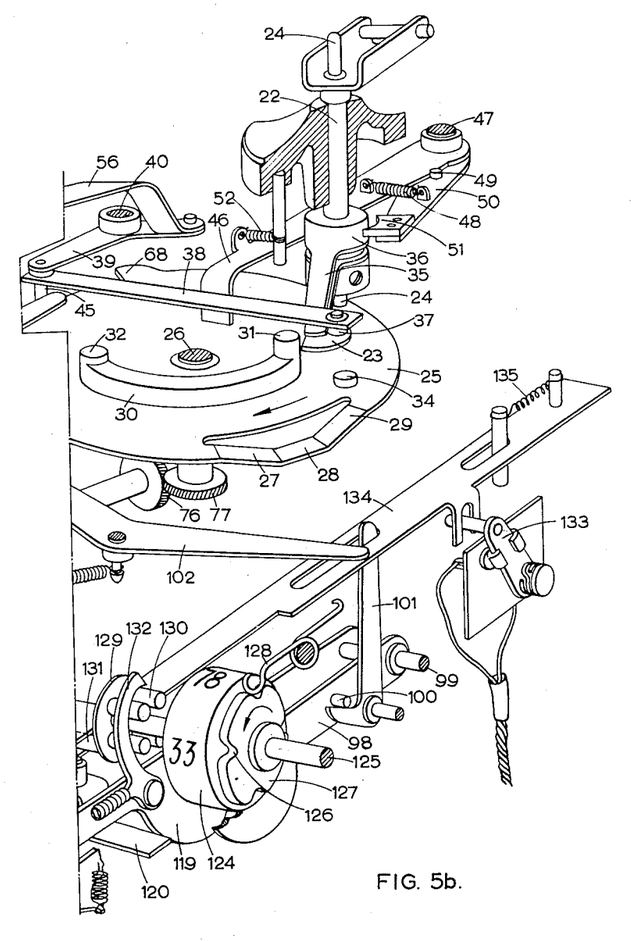

It will be appreciated that with the record releasing mechanism as described records of substantially any thickness and diameter can be released automatically, and by employing a straight post the necessity for a record steadying weight or arm is avoided. Means to be described hereafter are provided for detaching said post from the apparatus so that records can be removed from the turntable thereof without having to pass the records up from the post. FIGURE 5 of the drawings illustrates mechanism for operating the record releasing means on the post and for controlling the landing position of the pick-up of the apparatus after a record has been gauged. The record post 1 already described is shown at the left hand side of the drawing, and at the right hand side of the drawing there is shown a spindle 22 on which is mounted the pick-up arm (not shown) of the apparatus, and which is adapted to pivot by means of a pick-up arm lever 23 rigidly connected to said spindle 22. The spindle 22 houses a rod 24 which is adapted to impart vertical movement to said pick-up arm in a manner which will hereafter be described.

A disc 25 is provided, said disc being mounted on a spindle 26 which is supported by the base plate (not shown) and arranged to be rotated through one revolution during each automatic cycle in a manner to be subsequently described. The dsc 25 is mounted so that the rod 24 engages the upper surface thereof close to the periphery of said disc 25. There is provided in said disc 25 in the path of the rod 24 consecutively a downward ramp 27, a substantially horizontal portion 28 and an upward ramp 29 such that when said rod 24 traverses said ramps the pick-up arm is moved vertically downwardly and then upwardly. Integral with the disc 25 and disposed on the upper surface thereof close to the centre thereof is a cam segment 30 having at its two ends raised bosses 31 and 32 the boss 31 being greater in height than the boss 32. Further from the centre in the positions shown in the drawing are two abutments 33 and 34.

In order to control the landing position of the pick-up, control means are provided which include a stop which is retained in an adjusted position determined by the diameter of a record to be played, said stop being adjusted in position under the control of the gauging member which in this embodiment is the pick-up arm. In the apparatus shown the stop comprises an arm 35 carried by a collar 36 which is rotatably mounted on the spindle 22, and supports the arm 35 with its free end disposed immediately above the free end of the pick-up arm lever 23 and in the path of a pin 37 carried by said lever 23. The pin 37 is disposed to the right of the stop 35 as seen in FIGURE 5, so that the pin 37 can engage and impart a clockwise movement to the stop 35 under the control of the pick-up arm.. Also connected to the pin 37 is a link 38 which couples the pick-up arm lever 23 to one arm of a bell crank lever 39 freely mounted on a spindle 40 which is secured to the base plate (not shown). Adjacent to said arm of the lever 39 is another lever 41 connected to a lever 42 via a friction disc 43. The arrangement is such that either of the abutments 33 and 34 will engage the lever 42 and move it against the pressure of a tension spring 44. The lever 41 is rotated in conjunction with the lever 42 and engages an abutment 45 on the link 38 so as to move the pick-up arm inwardly through a predetermined arc which is arranged to equal the total required inward movement of said pick-up arm from its position to rest.

The cam segment 30 is adapted to make contact with the end of a brake lever 46 which is pivotally mounted on a shaft 47 carried by the baseplate and coupled by means of a spring 48 and an abutment 49 to a brake arm 50 also mounted on the shaft 47 and carrying at its end a brake pad 51 which is adapted to make contact with the collar 36 of the stop 35. The brake lever 46 and brake arm 50 are normally spring urged by means of spring 52 to a position in which the brake pad 51 is held away from the collar 36 of the stop lever 35. When the cam segment 30 is in engagement with the brake lever 46, however, said lever is urged clockwise against the pressure of the spring 52 so that the brake pad 51 engages said collar 36 so as to hold the stop lever 35 in a fixed position.

Figure 6:
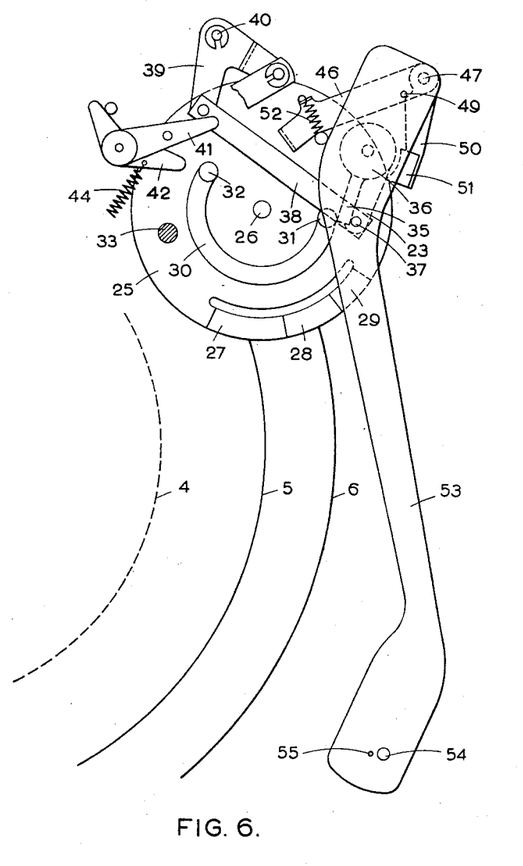
FIGURES 6 to 9 are plan views of the stop mechanism in different positions whilst engaged in gauging the diameter of a record.
Figure 7:
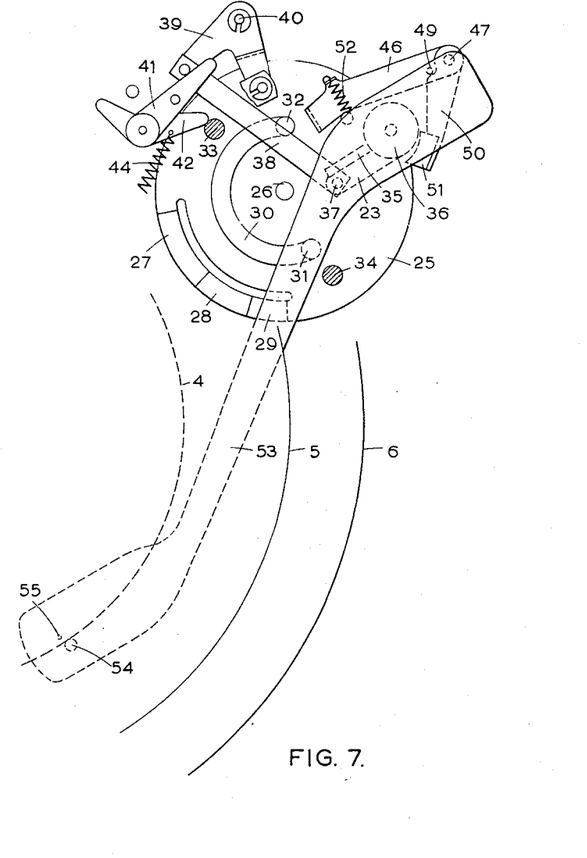
Figure 8:
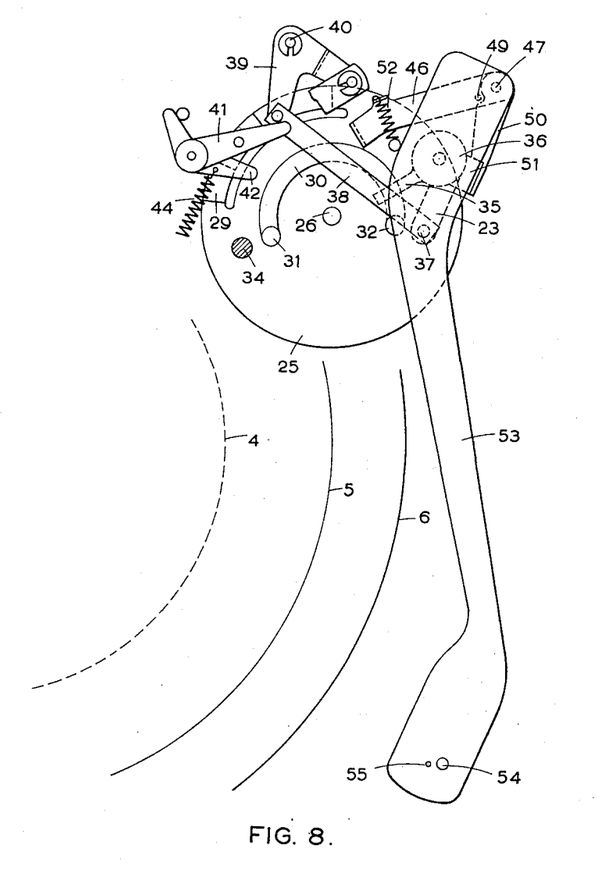
Figure 9:
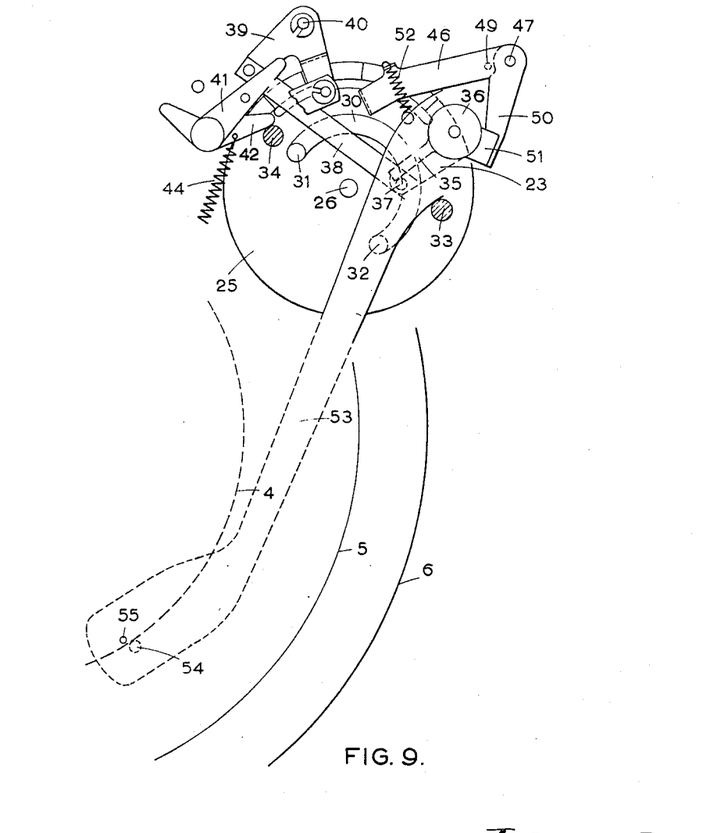
Figure 10:
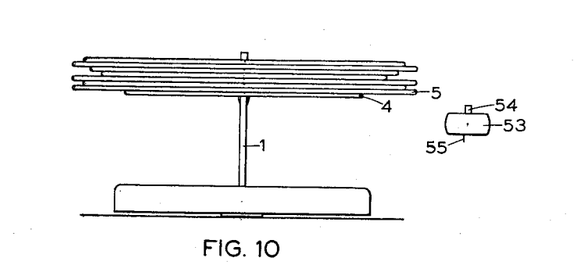
FIGURES 10 to 15 are front elevations of the gramophone record playing apparatus showing the different positions of the pick-up and the lowermost record in the stack during a record releasing and gauging operation.
Figure 11:
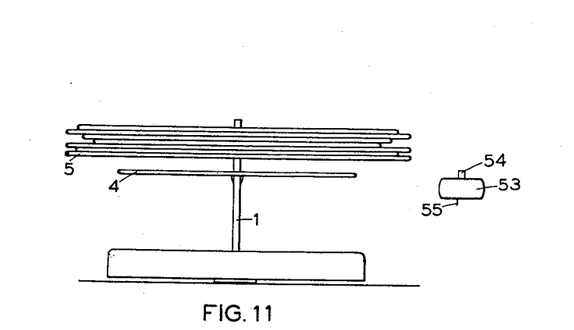
Figure 12:
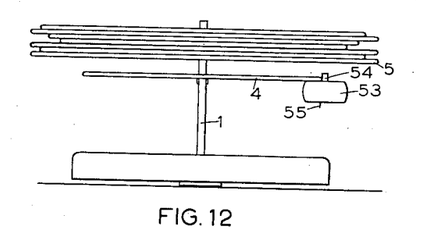
Figure 13:
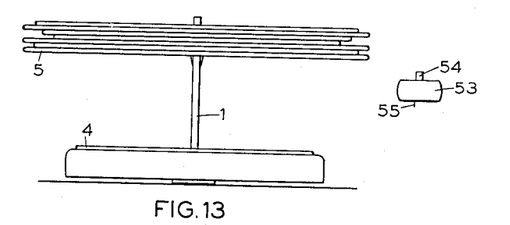
Figure 14:
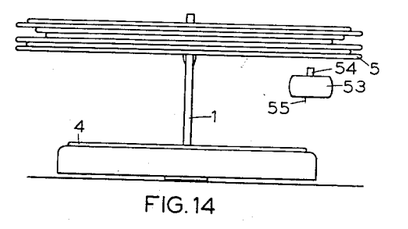
Figure 15:
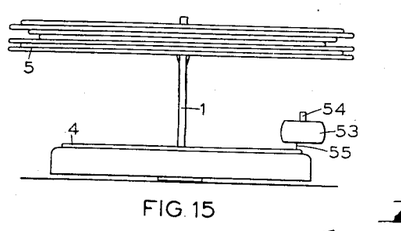

During the playing of a record the rod 24 resides on the horizontal portion 28 between the ramps 27 and 29 and at the end of the playing of the record the disc 25 is caused to rotate in the direction of the arrow in a manner which will hereafter be described. Thus the rod 24 moves up the ramp 29 so that the pick-up arm is raised. The boss 31 then engages the stop 35 and the pick-up arm lever 23 and pivots these in an anti-clockwise direction so as to move the pick-up arm outwardly through an arc to a position of rest in which the pick-up is out of the path of any record which may move down the spindle 1. The position of the machanism at this stage is shown in FIGURE 6 in which the pick-up arm is indicated at 53. It is arranged by means to be described hereafter that whilst the mechanism is in the position shown in FIGURE 6 the lowermost record of a stack of records supported on the record post 1 is allowed to fall onto the subsidiary supporting members 9 into the intermediate position between the next lowermost record in the stack and the turntable and whilst in this intermediate position the diameter of the record is gauged. Whilst the record is suported in said intermediate position the abutment 33 engages the lever 42 and rotates it and the lever 41 in an anticlockwise direction so that the link 38 moves the stop 35 and pick-up arm 23 in a clockwise direction until an abutment 54 on said pick-up arm engages the periphery of said record. Preferably said abutment 54 is eccentrically mounted so as to enable a fine adjustment of the landing position of the pick-up to be effected. When said abutment 54 engages the periphery of said record the pick-up arm, and so also the stop 35, cannot continue their clockwise movement so the abutment 45 on the link 38 is maintainted stationary and since the lever 42 continues to be rotated by the abutment 33 and the lever 41 cannot rotate further slip occurs between said levers 41 and 42. The cam segment 30 now engages the end of the brake lever 46 so that the brake pad 51 engages the collar 36 of the stop 35 and holds said stop in the said position to which it has been set by the pick-up arm as determined by the diameter of the record about to be played. At this stage the abutment 33 has moved out of engagement with the lever 42 and the spring 44 has restored the lever 42 to its original position, thereby moving the lever 41 away from the abutment on the link 38. Whilst the stop 35 is still held in its set position the shorter boss 32 engages the lever 23 and so moves the pick-up arm in an anticlockwise direction to the rest position as shown in FIGURE 8. The gauged record is then allowed to fall to the turntable after which the longer abutment 34 engages the lever 42 and causes the lever 41 to rotate in an anticlockwise direction into engagement with the abutment 45 on the link 38 so that the link 38 moves the stop 35 and so the pick-up arm 23 in a clockwise direction until the lever 23 engages the fixed stop lever 35 at the moment when the pick-up is above the periphery of the record, as shown in FIGURE 9. The rod 24 then travels down the ramp 27 so that said pick-up 55 lands on the edge of the record on the turntable and locates the starting groove of the record. At this stage the abutment 34 has moved past the lever 42, thereby permitting the spring 44 to restore the levers 41 and 42 and thereby disengage the lever 41 from the abutment 45, the cam segment 30 ceases to engage the brake lever 46 and the control disc 25 comes to rest. Disengagement of the cam segment 30 from the lever 46 permits said lever 46 to rotate in an anticlockwise direction by the spring 52. Thus the lever 46 engages abutment 49 and rotates the lever 50 likewise in an anticlockwise direction so that the brake pad 51 is removed from the collar 36 and the pick-up arm is able to continue its clockwise movement following the record groove. Thus whilst a record is supported in an intermediate position the pick-up arm gauges the diameter thereof, and the stop 35 which is normally adjustable in position under the control of said pick-up arm is retained by the brake pad 51 in an adjusted position determined by said gauged diameter so as to control the landing position of the pick-up, and is released by disengagement of said brake pad 51 to enable the pick-up to track the record.

The disc 25 comes to rest at the end of an automatic cycle in a position such that during a subsequent automatic cycle, initial movement of disc 25 moves abutment 31 into engagement with stop 35 and displaces it anticlockwise about pick-up shaft 22. Stop 35 in turn engages pin 37 on pick-up arm lever 23 and moves that lever and the pick-up arm anticlockwise. The pick-up arm is thus displaced outwardly towards its position of rest and abutment 31 moves past stop 35 as soon as the pick-up arm reaches the rest position.

Abutment 31 thus leaves stop 35 in engagement with pin 37 so that it can again be moved by the pick-up arm to either the same or a different stopping position, as determined by the size of the next record to be released, when later in the cycle the pick-up arm is moved inwardly to gauge the size of the record after it has been released from the stack and while it is held in the intermediate position.

FIGURES 10 to 15 are views showing respectively the pick-up arm in the rest position before and after the lowermost record has been caused to fall on the subsidiary supporting members, the pick-up arm gauging the diameter of a record, the pick-up arm again in the rest position to permit said record to fall onto the turntable of the apparatus and the pick-up above the periphery of the record and engaging the surface of said record.

After the last record of a stack has been played the pick-up arm is caused to perform the same movements as described above except that since no record is supported on the subsidiary supporting members the pick-up arm 53 travels its maximum distance in the clockwise direction when the abutment 33 engages the lever 42. Thus the lever 41 is able to move further than if there were a record supported by said subsidiary members. This additional movement is arranged to condition the apparatus to switch off. For this purpose the other arm of the bell crank lever 39 is connected via a link 56 to a lever 57 which is mounted on a pivot 58 carried by the base plate. The link 56 is provided with a notch 59. When the pick-up arm 53 is in the rest position said notch 59 is adjacent a lug 60 of a lever 61 which is pivotally mounted at 62 and associated with a spring 63 urging said lug 60 against the link 56. Whilst the records are being played the lug 60 is held away from the link 56 by means of a latching lever 64 pivotally mounted at 65 and spring urged to engage an abutment 66 on the lever 61 and hold said lug 60 away from said link 56. When the last record has been played the engagement of the abutment 33 with the lever 42 causes the lever 41 to execute the aforementioned additional movement. A rod 67 is mounted on said lever 41 so that this additional movement causes the rod 67 to engage the latching lever 64 and turn it in an anti-clockwise direction about the pivot 65. The pressure on the abutment 66 is thus released, the latching lever 64 being disengaged therefrom so that the spring 63 urges the lug 60 against the link 56 which during clockwise rotation of the pick-up arm 53 moves substantially longitudinally from right to left as shown in the drawing. By engagement of the boss 32 on the disc 25 with the pick-up lever 23 the pick-up arm 53 is rotated in an anti-clockwise direction so that the link 56 moves from left to right. When the pick-up arm 53 reaches its rest position the lug 60 enters the notch 59 so that the link 56 and so the pick-up arm 53 is held in a fixed position. The disc 25 will continue to rotate until the position at which the rod 24 travels down the ramp 27 is reached when the pick-up arm instead of lowering onto a record will lower onto a fixed post 68, shown in FIGURE 1, out of the path of the turntable. The lever 60 is coupled to a further lever (not shown) connected to a mainswitch in such a manner that when the lug 60 engages the notch 59 this further lever is moved into the path of an abutment 68 on the periphery of the disc 25 so as to operate said mainswitch.

The disc 25 is associated with a driving system the nature of which will hereafter be described, which is arranged to be coupled to said disc during each automatic cycle so as to rotate said disc through one revolution during such cycle, and to be decoupled from said disc during the playing of records.

For the purpose of coupling and decoupling said driving system for the disc 25 at the beginning and end respectively of each automatic cycle there is provided a wheel 69 driven at a constant speed in a clockwise direction from the driving shaft 70 of a motor (not shown). The wheel 69 is coupled during an automatic cycle to a further wheel 71 which is mounted on a shaft 72 having a worm 73 engaging a worm wheel 74. Said worm wheel 74 is mounted on a substantially horizontal shaft 75 which has at one end a helical gear 76 in mesh with a similar gear 77 mounted on disc 25 integral with the disc 25.

The wheel 69 is mounted on a carriage 69a which is supported on one end of a lever 79 that is pivotally mounted on a shaft 80 carried by the baseplate. Carriage 69a is slidably mounted on lever 79 in any suitable manner (not shown) so that it can undergo limited movement relative thereto and lever 79 can move anticlockwise from an operative position in which it is shown in FIGURE 5 to an inoperative position in which wheel 69 cannot engage the wheel 71 and the shaft 70. In the operative position of lever 79, wheel 69 can engage wheel 71 and shaft 70 and it is urged into resilient engagement with them by a spring 78 that is anchored to carriage 69 and to a pin (not shown) carried by the baseplate.

Movement of lever 79 from the position shown to the inoperative position is controlled by a lever 83 which is formed with a slot 83b and rotatably and slidably mounted on a pin 83c carried by the baseplate. Lever 83 is coupled to lever 79 by a pin 82 which engages in an aperture in lever 79 and the other end of lever 83 carries an abutment 83a. When lever 79 is in its operative position, lever 83 is held in the position shown with abutment 83a disposed in the path of movement of abutment 68 on the periphery of disc 25. During each automatic cycle of the mechanism rotation of disc 25 moves abutment 68 clockwise towards lever 83 and, almost at the end of each cycle, abutment 68 moves into engagement with abutment 83a and causes lever 83 to be deflected anticlockwise about pin 83c. This movement of lever 83 rotates lever 79 anticlockwise about shaft 80 to its inoperative position, wheel 69 is decoupled from wheel 71 and shaft 70 and control disc 25 comes to rest. Movement of lever 79 is assisted by a toggle action mechanism comprising a disc 84 mounted for rotation about a shaft 84a. Disc 84 is formed with a radial slot 88 and provided with a lug 86 to which one end of a spring 85 is anchored. The other end of spring 85 is anchored to a pin (not shown) carried by the baseplate. As shown in FIGURE 5, one end of lever 79 overlies disc 84 and is provided with a slot 81 therein. A rod 87, carried by a lever 89, which will be referred to more fully hereinafter, passes through slots 81 and 88, and couples lever 79 to disc 84. Lever 79 is held in the operative position in which it is shown due to the spring 85 being disposed to one side of shaft 84a such that it biasses disc 84 in a clockwise direction. When lever 79 is moved to the inoperative position by engagement of abutment 68 on disc 25 with arm 83, it causes rod 87 to move disc 84 anticlockwise so that spring 85 becomes loaded as it moves towards the dead centre position in alignment with shaft 84a and when spring 85 passes the dead centre position it biasses disc 84 in an anticlockwise direction and causes rod 82 to hold lever 79 in the inoperative position, such that wheel 69 is decoupled from the shaft 70 and the wheel 71.

The rod 87 is mounted at one end of the aforementioned pivotal lever 89 carried by a shaft 89a secured to the base plate. A trip lever 90 is rotatably mounted on lever 89 and frictionally coupled to a further lever 91 via a friction disc 92, said levers 90 and 91 being normally disposed at 90° to each other.

During the playing of a record, when the wheel 69 is disengaged from the wheel 71 and driving shaft 70, the link 56 which is coupled to the pick-up arm via lever 39, link 38 and lever 37, is moved longitudinally from right to left and rotates the lever 57 in a clockwise direction about shaft 58. During the later stages of the playing of the record an abutment 93 on lever 57 engages the lever 91 and so rotates it and trip lever 90 in an anticlockwise direction. Thus a roller 84 mounted on the end of the trip lever 90 is moved into the path of an abutment 95 mounted on the shaft 96 of the turntable 97 of the apparatus.. During the playing of a record, movement imparted by the pick-up arm to levers 90 and 91 during a revolution of the turntable is relatively slight and abutment 95 merely engages roller 90 and silently deflects it and lever 90 off its path each time it engages roller 94, the friction disc 92 between levers 90 and 91 permitting lost motion to occur between the levers. The friction disc 92 permits trip lever 90 to be alternately fed into the path of abutment 95 and deflected therefrom while a record is being played but when the pick-up reaches the end of the sound track and moves into the lead-out groove of the record its rate of movement increases and causes a large deflection of lever 90 which thereupon moves into a position in which its end 90a is engaged by abument 95 and lever 90 is displaced in such manner that the lever system 89, 90, 91 is rotated anti-clockwise about shaft 89a and rod 87 is caused to displace lever 79 clockwise about shaft 80 from its inoperative position to the operative position shown in which wheel 69 couples driving wheel 70 to wheel 71. Rod 87 also rotates toggle plate 84 clockwise about shaft 84a, thereby actuating the toggle mechanism to hold lever 79 in its operative position. This movement of toggle plate 84 also causes lug 86 thereon to deflect lever 61 and reset the engagement of latching lever 64 with the abutment 66 on lever 61. Movement of lever 79 to its operative position causes lever 83 to be displaced from left to right in the figure to the position shown in which abutment 83a is disposed in the path of abutment 68 on control disc 25.

In addition to the means described above for automatically coupling and decoupling the driving mechanism for the disc 25 there is provided additional means for coupling the mechanism manually, for example when the first record of a stack is required to be played. In the present example this is effected by depressing a lever 98 but it can of course equally well be effected by rotation of a knob or other suitable means. Lever 98 is partly cut away to show the speed changing mechanism which will be described hereafter. The lever 98 is pivoted at 99 and depression of said lever 98 causes an abutment 100 thereon to pivot a lever 101 which in turn pivots a lever 102 so that an end thereof moves into engagement with the stud 83a on arm 83 and causes arm 83 to rotate lever 79 clockwise to the operative position, shown in FIGURE 5, in which wheel 69 couples the driving shaft 70 to wheel 71 to commence an automatic cycle of the mechanism.

At the end of the shaft 75 remote from the helical gear 76 is mounted a cam wheel 103 having an integral cam segment 104 the purpose of which is to impart a downward thrust to the spindle 2 in the record post 1 which, as previously described, causes the lowermost record of a stack supported on the main supporting members 3 to fall onto subsidiary supporting members 9, at an instant during the automatic cycle already referred to. For operation of said cam segment 104 there is provided a bracket 105 mounted on a bracket 106 fixed to the underside of the baseplate said bracket 105 being arranged to be movable longitudinally with respect to the bracket 106 against the pressure of a spring 107. The bracket 105 is provided with turned up flanges 108 which carry a pivot pin 109 on which is mounted a lever 110 which can thus pivot vertically in addition to moving horizontally in conjunction with the bracket 105. In the lever 110 is provided a keyhole aperture 111 adapted to accommodate the end of the spindle 2. In the inoperative position of the driving system for the disc 25, that is when the wheel 69 is decoupled from the wheel 71 and driving shaft 70 the spindle 2 is arranged to be in alignment with the large portion of the aperture 111 so that the record post 1 is freely removable from the apparatus and is not in engagement with the driving system. The cam wheel 103 is adapted to reside in a slot in the lever 110 and during the automatic cycle said cam wheel 103 moves the bracket 105 and lever 110 longitudinally against the spring 108 so that the spindle 2 is caused to be in alignment with the narrow portion of the keyhole aperture 111. The end of the spindle 2 is provided with a flange or other suitable projection so that when said spindle 2 is in alignment with said narrow portion of the aperture 11 the flange engages the underside of the lever 110. When the cam segment 104 engages the lever 110 at a predetermined instant during the automatic cycle said cam segment 104 urges said lever 110 downwardly so moving the spindle 2 in a downward direction and releasing a record to fall onto the subsidiary supporting members 9. When the cam segment 104 ceases to engage the lever 110 the lever 110 moves upwardly and the spindle 2 is arranged to move upwardly in conjunction therewith so as to retract the members 9 within the post 1 and allow said record to fall down the post 1 onto the turntable 97.

The turntable 97 is driven via a movably mounted wheel 112 spring urged as shown by means of a spring 113, into engagement with the rim of the turntable and one of a plurality of stepped segments of the driving shaft 70, each of said segments corresponding to a different rotational speed of the turntable 97. The wheel 112 is mounted at one end of a lever 114 which is rotatable on and displaceable along a shaft 115 and a downward thrust is imparted to said lever by means of a compression spring 116. The wheel 112 can be pivoted out of engagement with the segments of the driving shaft 70, before being moved along the shaft 115 to change the speed of rotation of the turntable 97. The operation of a push button 117 is arranged to effect this change of speed. The push button 117 is coupled to a lever 118 having a cam 119 which is in engagement with one end of a lever 120. The lever 120 is pivotally mounted at 121 and supports at its other end a pin 122 in contact with the lever 114. Thus when the push button 117, and so the lever 118, is depressed the lever 120 is pivoted by means of the cam 119 so that the pin 122 is caused to rotate the lever 114 in an anticlockwise direction against the spring 113, so as to disengage the wheel 112 from the turntable 97 and driving shaft 70. Mounted immediately beneath the turntable deck and viewable through a window 123 therein, shown in FIGURE 1, is a roller 124 rotatably mounted on a horizontal spindle 125 and bearing spaced around its periphery numerals corresponding to different speeds at which the turntable 97 is capable of rotating. Associated with each numeral is a notch 126 provided in an integral projection 127 of said roller which notches are arranged to be engaged consecutively by a spring 128 which holds the roller in position at each speed setting. Coupled to the roller 124 is a disc 129 having on the side thereof adjacent said roller 124 a series of pins 130 corresponding in number to the number of possible different speeds of rotation of the turntable 97, and on the other side of said disc 129 is a single eccentrically disposed pin 131. The pins 130 are disposed around the disc 129 so that a spring urged pawl 132 pivotally mounted on the lever 118, can, on depression of said lever 118, engage one of the pins 130 and rotate the disc 129 and so the roller 124 in an anticlockwise direction. This rotation will move the roller 124 through an angle corresponding to the separation of two adjacent ones of the afore-mentioned numerals or of two adjacent notches 126 when the spring 128 will engage the next one of said notches 125 and hold the roller 124 in position. Thus each depression of the speed push button 117 causes the roller 124 to rotate so that the next adjacent numeral is visible through the window 123. The pin 131 engages the underside of the lever 114 and since said pin 131 is arranged to be in a different vertical position for each different registered speed it will raise said lever 114 against the pressure of the spring 116 or permit said lever 114 by virtue of said spring 116 to lower so that engagement of the wheel 112 with the respective segment of the driving shaft 70 can be effected in order that the turntable 97 may be rotated at a speed corresponding to the particular numeral visible through window 123. As described above whilst the vertical disposition of the wheel 112 is altered to change the speed of rotation of the turntable 97 said wheel 112 is maintained out of contact with the driving shaft 70 by means of the pivotal movement imparted to lever 120 by the cam 119.

In addition means for automatically decoupling the pulley 112 from the driving shaft 70 are provided in conjunction with a switch 133 for disconnecting the supply of electricity to the apparatus. In order to effect this disconnection the moving element of the switch 133 is coupled to a slidably mounted member 134 in the manner shown, so that movement of said element to the off position moves said member from left to right against the pressure of a spring 135. The member 134 is coupled to the pin 122 in such a manner that said movement of said member 134 causes the pin 122 to pivot the lever 114 and so decouple the wheel 112 from the driving shaft 70.

Although the present invention has been particularly described with reference to the preferred form of record post it will be appreciated that any record post can be employed provided subsidiary supporting means for supporting a record in a position intermediate the stack of records and the turntable are provided; for example the record post may be of the off-set form in which case a record steadying arm will usually be required. Moreover other mechanism for changing the speed of rotation of the turntable and for stopping and starting the apparatus may be employed.

What I claim is:

1. Gramophone record playing apparatus comprising a gauging member, automatic means for causing said member to engage the periphery of a record to be played to gauge the diameter of said record, and controlling means comprising a stop, means mounting said stop for movement and adjustment in position under the control of said automatic means to any position within a range of movement and determined by said gauged diameter and means for retaining said stop in its adjusted position to control the landing position of a pick-up to enable said pick up to land on a record of any diameter within a range of diameters and means for releasing said retaining means to enable said pick-up to track the record.

2. Apparatus according to claim 1 comprising a pick-up arm said pick-up arm constituting said gauging member.

3. Gramophone record playing apparatus comprising a turntable for supporting a record, a gauging member, record supporting means comprising means for supporting a pile of records to be played above the turntable, releasing means for releasing the lowermost record in the pile to enable it to move towards said turntable, and means for thereafter temporarily supporting the released record in an intermediate position above the turntable, automatic means for causing said gauging member to engage the periphery of said released record whilst supported in said intermediate position to gauge the diameter of said record, and controlling means comprising a stop, means mounting said stop for movement and adjustment in position under the control of said automatic means to any position within a range of movement and determined by said gauged diameter, and means for retaining said stop in its adjusted position to control the landing position of a pick-up to enable said pick-up to land on a record of any diameter within a range of diameters, and means for releasing said retaining means to enable the pick-up to track the record.

4. Apparatus according to claim 3 comprising a pick-up arm said pick-up arm constituting said gauging member.

5. Apparatus according to claim 1 comprising a spindle supporting said gauging member, a lever mounted for rotation about said spindle, said lever constituting said stop, means for rotating said spindle in one direction to cause said gauging member to move towards and engage the periphery of a record, means coupled to said spindle for displacing said lever to said any position whilst said spindel rotates in said one direction, a movably mounted brake pad constituting said retaining means, means for moving said brake pad into engagement with said lever when said lever is in said any position, and means for subsequently moving said brake pad out of engagement with said lever to enable said pick-up to track said record.

6. Gramophone record playing apparatus comprising a turntable for supporting a record, a pick-up arm, record supporting means comprising means for supporting a pile of records to be played above the turntable, releasing means for releasing the lowermost record in said pile thereby to enable it to move towards said turntable, and means for thereafter supporting the reelased record in an intermediate position above the turntable, automatic means for causing said pick-up arm to engage the periphery of said released record whilst supported in said intermediate position to gauge the diameter of said record, means for controlling the landing position of a pick-up carried by said arm according to said gauged diameter to enable said pick-up to land on records of different diameters, a rotatable disc, a motor coupled to a driving system for driving said disc, an abutment on said disc, and means for engaging said abutment to decouple said driving system from said motor at the end of each automatic cycle.

7. Gramophone record playing apparatus comprising a turntable for supporting a record, a pick-up arm, record supporting means comprising means for supporting a pile of records to be played above the turntable, releasing means for releasing the lowermost record in said pile thereby to enable it to move towards said turntable, and means for thereafter supporting the reelased record in an intermediate position above the turntable, automatic means for causing said pick-up arm to engage the periphery of said released record whilst supported in said intermediate position to gauge the diameter of said record, means for controlling the landing position of a pick-up carried by said arm according to said gauged diameter to enable said pick-up to land on records of different diameters, a record post, a plurality of retractable members disposed around said post for supporting a pile of records to be played above the turntable, temporary supporting means disposed above said members to engage and support the lowermost but one record of said pile of records whilst said members are retracted within the post to release the lowermost record of the pile, and subsidiary retractable record supporting means arranged below said members to intercept the released record and to support said record in said intermediate position above the turntable whilst the diameter of said record is gauged.

8. Gramophone record playing apparatus comprising a turntable for supporting a record, a pick-up arm, record supporting means comprising means for supporting a pile of records to be played above the turntable, releasing means for releasing the lowermost record in said pile thereby to enable it to move towards said turntable, and means for thereafter supporting the released record in an intermediate position above the turntable, automatic means for causing said pick-up arm to engage the periphery of said released record whilst supported in said intermediate position to gauge the diameter of said record, means for controlling the landing position of a pick-up carried by said arm according to said gauged diameter to enable said pick-up to land on records of different diameters, a record post, a plurality of retractable members disposed around said post for supporting a pile of records to be played above the turntable, temporary supporting means disposed above said members to engage and support the lowermost but one record of said pile of records whilst said members are retracted within the post to release the lowermost record of the pile, and subsidiary retractable record supporting means arranged below said members to intercept the released record and to support said record in an intermediate position above the turntable whilst the diameter of said record is gauged, and a push rod housed in said record post, and means for moving said push rod downwardly and then upwardly during a record changing cycle, and a collar on said push rod for normally maintaining said retractable members in an extended position and for allowing said retractable members to retract within said record post and causing said subsidiary supporting means to project from said record post, on downward movement of said push rod, and for causing said retractable members to extend from said post, on upward movement of said push rod and an enlarged portion on said push rod for urging said temporary supporting means downwardly to locate the gap between the two lowermost records in the pile and for causing said temporary supporting means to project from said record post when said gap is located on downward movement of said push rod, and for causing said temporary supporting means to retract within the post, and move upwardly on upward movement of said push rod.

References Cited in the file of this patent

UNITED STATES PATENTS

| 2,643,127 | Gregg | June 23, 1953 |
| 2,818,263 | Dale | Dec. 31, 1957 |
| 2,868,545 | Vistain | Jan. 13, 1959 |
| 2,873,977 | Manning | Feb. 17, 1959 |

FOREIGN PATENTS

| 544,282 | Great Britain | June 28, 1943 |